US012737721B2

(12) United States Patent
Li et al.

(10) Patent No.: US 12,737,721 B2
(45) Date of Patent: Sep. 15, 2026

(54) SERVER AND METHOD FOR MANAGING ORDERS

(71) Applicant: GRABTAXI HOLDINGS PTE. LTD., Singapore (SG)

(72) Inventors: Sai-Ming Li, Issaquah, WA (US); Brandon O'Brien, Snohomish (UA)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 208 days.

(21) Appl. No.: 18/567,153

(22) PCT Filed: Jun. 27, 2022

(86) PCT No.: PCT/SG2022/050441
§ 371 (c)(1),
(2) Date: Dec. 5, 2023

(87) PCT Pub. No.: WO2023/277809
PCT Pub. Date: Jan. 5, 2023

(65) Prior Publication Data

US 2024/0265343 A1 Aug. 8, 2024

(30) Foreign Application Priority Data

Jun. 30, 2021 (SG) ........................... 10202107189Y

(51) Int. Cl.
*G06Q 10/087* (2023.01)

(52) U.S. Cl.
CPC ................................. *G06Q 10/087* (2013.01)

(58) Field of Classification Search
None
See application file for complete search history.

(56) References Cited

U.S. PATENT DOCUMENTS 8,594,617 B2 * 11/2013 Papakostas ........... H04W 24/00 455/405
10,592,925 B2 * 3/2020 Dennett ............. G06Q 30/0605
(Continued)

FOREIGN PATENT DOCUMENTS

CA 2760901 C * 1/2021 ............ H04L 65/40
CN 109064242 A 12/2018
(Continued)

OTHER PUBLICATIONS

International Search Report and Written Opinion dated Jan. 13, 2023 which was issued in connection with PCT/SG2022/050441.

*Primary Examiner* — Fateh M Obaid
(74) *Attorney, Agent, or Firm* — Maschoff Brennan

(57) ABSTRACT

A system configured for managing orders is disclosed. The system may include one or more processor(s) which may determine a plurality of merchants selling a product within a predetermined area; determine an original price of the product sold by each merchant of the plurality of determine a discount that each merchant of the plurality of merchants is willing to offer on the product; determine a minimum selling price of the product based on the original price and the discount from each merchant of the plurality of merchants; rank the plurality of merchants based on the minimum selling price of each merchant and determine top N merchants out of the plurality of merchants, wherein when a user puts in an order for the product, the system allocates the order to a highest rank merchant out of the top N merchants.

17 Claims, 4 Drawing Sheets

(56) References Cited

U.S. PATENT DOCUMENTS

| | | | | |
|---|---|---|---|---|
| 10,909,486 | B1 * | 2/2021 | Tsou | G06Q 10/06315 |
| 11,611,995 | B2 * | 3/2023 | Li | H04W 74/0833 |
| 11,941,089 | B2 * | 3/2024 | Baldwin | G06K 7/1417 |
| 2002/0107747 | A1 * | 8/2002 | Gerogianni | G06Q 30/06 705/26.8 |
| 2007/0150387 | A1 * | 6/2007 | Seubert | G06Q 10/10 705/31 |
| 2007/0239560 | A1 * | 10/2007 | McGuire | G06Q 30/08 705/14.46 |
| 2011/0258029 | A1 * | 10/2011 | Lutnick | G06Q 50/12 705/26.8 |
| 2014/0101001 | A1 * | 4/2014 | Brown | G06Q 10/087 705/28 |
| 2014/0281918 | A1 * | 9/2014 | Wei | H04L 67/56 715/234 |
| 2017/0069017 | A1 * | 3/2017 | Friedman | G06Q 30/08 |
| 2017/0287038 | A1 * | 10/2017 | Krasadakis | G06Q 30/0201 |
| 2018/0240167 | A1 * | 8/2018 | Kumar | G06Q 30/0635 |
| 2018/0330314 | A1 * | 11/2018 | Pareek | G06Q 30/0201 |
| 2019/0019124 | A1 * | 1/2019 | Shariff | G06N 20/00 |
| 2022/0222731 | A1 * | 7/2022 | Kumar | G06Q 30/0253 |

FOREIGN PATENT DOCUMENTS

| | | | | |
|---|---|---|---|---|
| CN | 111523922 A | | 8/2020 | |
| CN | 115222197 A | * | 10/2022 | G06Q 50/18 |

* cited by examiner

300

| Name (302) | Listing price (304) | Maximum discount offered (306) | Min offer price (308) | Quality score (310) | Ranking score (312) | Ranking (314) |
|---|---|---|---|---|---|---|
| restaurant 1 | $10.00 | 10.00% | $9.00 | 0.85 | 1.35 | 4 |
| **restaurant 2** | **$9.50** | **15.00%** | **$8.08** | **0.92** | **0.65** | **1** |
| **restaurant 3** | **$11.00** | **20.00%** | **$8.80** | **0.87** | **1.14** | **3** |
| restaurant 4 | $10.50 | 15.00% | $8.93 | 0.78 | 1.96 | 5 |
| **restaurant 5** | **$9.00** | **10.00%** | **$8.10** | **0.88** | **0.97** | **2** |

FIG. 3

SERVER AND METHOD FOR MANAGING ORDERS

CROSS REFERENCE

The present invention is a 371 of International Application No. PCT/SG2022/050441, filed on Jun. 27, 2022, and claiming priority to Singapore Application No. 10202107189Y filed on Jun. 30, 2021, incorporated by reference herein in its entirety.

TECHNICAL FIELD

Various aspects of this disclosure relate to a server configured for managing orders. Various aspects of this disclosure relate to a method for managing orders. Various aspects of this disclosure relate to a non-transitory computer-readable medium storing computer executable code for managing orders. Various aspects of this disclosure relate to a computer executable code for managing orders.

BACKGROUND

In the restaurant industry, there is often a temporary mismatch between demand and supply among restaurants, even if the restaurants are near each other, and have similar offerings and quality. For example, right after a concert event, the restaurants near the venue will experience a surge in customers, while other restaurants a block or two away still have normal traffic, and have capacity to serve more customers. Like any other markets, a mismatch between supply and demand may cause degraded services to customers especially for customers of the busy restaurants. However, other restaurants that still have capacity cannot absorb the excess demand because there is no channel to funnel the demand to the other restaurants.

The rise of food delivery apps may create another channel for demand generation. However, this channel may worsen the mismatch between supply and demand as demand through such apps can surge or drop for example due to some viral posts on social media. This may lead to a higher number of unsatisfied customers.

SUMMARY

Therefore, there may be a need to provide a system and/or application to channel excess demand to other service providers or merchants. There may also be a need for the system and/or application to effectively and accurately manage orders. There may also be a need to improve user experience, and/or decrease user costs, and/or improve profitability.

Various embodiments may provide a server configured for managing orders is disclosed. The server may include one or more processor(s) and a memory having instructions stored therein. The instructions when executed by the one or more processor(s), may cause the one or more processor(s) to: determine a plurality of merchants selling a product within a predetermined area. The one or more processor(s) may also determine an original price of the product sold by each merchant of the plurality of merchants. The one or more processor(s) may further determine a discount that each merchant of the plurality of merchants is willing to offer on the product. The one or more processor(s) may determine a minimum selling price of the product based on the original price and the discount from each merchant of the plurality of merchants. The one or more processor(s) may further rank the plurality of merchants based on the minimum selling price of each merchant and determine top N merchants out of the plurality of merchants, wherein when a user puts in an order for the product, the system allocates the order to a highest rank merchant out of the top N merchants.

According to various embodiments, the user may be unaware of which merchant the one or more processor allocates the order to until the user receives the product.

According to various embodiments, the one or more processor(s) may be configured to determine an order price for the product based a maximum selling price out of the minimum selling price of each merchant in the top N merchants.

According to various embodiments, the user may be notified of the order price of the product at the time of placing the order.

According to various embodiments, the one or more processor(s) may be configured to allocate the order to a second highest rank merchant out of the top N merchants if the highest rank merchant rejects the order.

According to various embodiments, the one or more processor(s) may be configured to receive information from each merchant out of the plurality of merchants every M period. The one or more processor(s) may be configured to redetermine a new top N merchants based on the information from each merchant.

According to various embodiments, the information may include at least one of: current merchant demand, and current availability of product.

According to various embodiments, the user may be located in the predetermined area.

Various embodiments may provide a method for managing orders. The method may include using one or more processor(s) to: determine a plurality of merchants selling a product within a predetermined area. The one or more processor(s) may also determine an original price of the product sold by each merchant of the plurality of merchants. The one or more processor(s) may further determine a discount that each merchant of the plurality of merchants is willing to offer on the product. The one or more processor(s) may determine a minimum selling price of the product based on the original price and the discount from each merchant of the plurality of merchants. The one or more processor(s) may further rank the plurality of merchants based on the minimum selling price of each merchant and determine top N merchants out of the plurality of merchants, wherein when a user puts in an order for the product, the system allocates the order to a highest rank merchant out of the top N merchants.

According to various embodiments, the method may include using the one or more processor(s) to: determine the at least one suitable merchant based on at least one of: a location of the first merchant, a category of items sold by the first merchant, a preparation time of the first merchant, and user preferences.

According to various embodiments, the user may be unaware of which merchant the one or more processor allocates the order to until the user receives the product.

According to various embodiments, the one or more processor(s) may be configured to determine an order price for the product based a maximum selling price out of the minimum selling price of each merchant in the top N merchants.

According to various embodiments, the user may be notified of the order price of the product at the time of placing the order.

According to various embodiments, the one or more processor(s) may be configured to allocate the order to a second highest rank merchant out of the top N merchants if the highest rank merchant rejects the order.

According to various embodiments, the one or more processor(s) may be configured to receive information from each merchant out of the plurality of merchants every M period. The one or more processor(s) may be configured to redetermine a new top N merchants based on the information from each merchant.

According to various embodiments, the information may include at least one of: current merchant demand, and current availability of product.

According to various embodiments, the user may be located in the predetermined area.

Various embodiments may provide a non-transitory computer-readable medium storing computer executable code including instructions for managing orders according to the various embodiments disclosed herein.

Various embodiments may provide a computer executable code including instructions for managing orders according to the various embodiments disclosed herein.

To the accomplishment of the foregoing and related ends, the one or more embodiments include the features hereinafter fully described and particularly pointed out in the claims. The following description and the associated drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The invention will be better understood with reference to the detailed description when considered in conjunction with the non-limiting examples and the accompanying drawings, in which:

FIG. 3 shows an exemplary table of quality scores of various merchants according to various embodiments.

DETAILED DESCRIPTION

Figure 1:
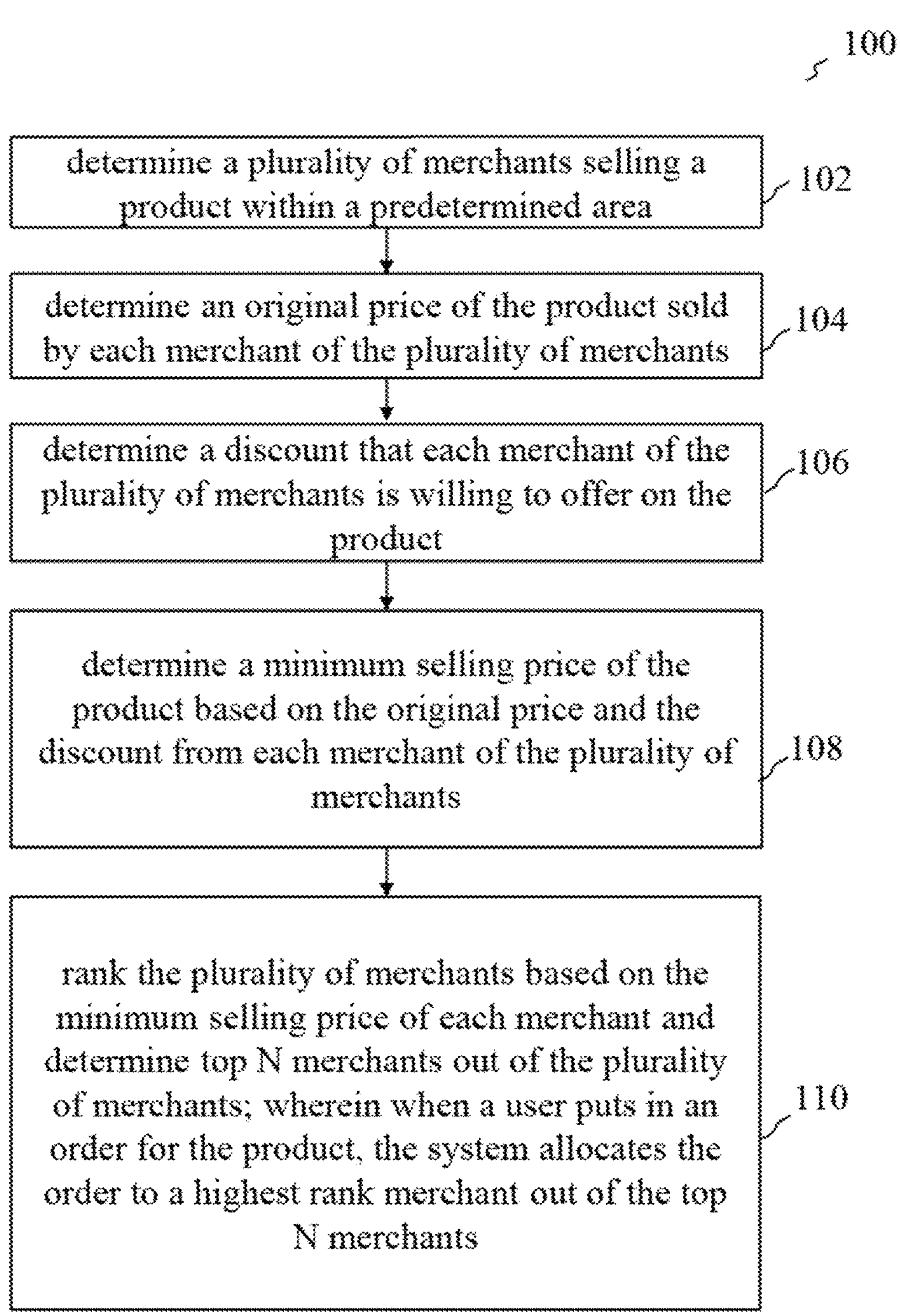
FIG. 1 shows a flowchart of a method for managing orders according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the systems or server or methods or computer program are analogously valid for the other systems or server or methods or computer program and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

The word "exemplary" is used herein to mean "serving as an example, instance, or illustration." Any embodiment or design described herein as "exemplary" is not necessarily to be construed as preferred or advantageous over other embodiments or designs In the context of various embodiments, the articles "a", "an", and "the" as used with regard to a feature or element include a reference to one or more of the features or elements.

As used herein, the term "and/or" includes any and all combinations of one or more of the associated listed items.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

FIG. 1 shows a flowchart of a method for managing orders according to various embodiments.

According to various embodiments, the method 100 of managing orders may be provided. In some embodiments, the method 100 may include a step 102 of using one or more processor(s) of a server to determine a plurality of merchants selling a product within a predetermined area. The method 100 may include a step 104 of using the one or more processor(s) to determine an original price of the product sold by each merchant of the plurality of merchants. The method 100 may include a step 106 of using the one or more processor(s) to determine a discount that each merchant of the plurality of merchants is willing to offer on the product. The method 100 may include a step 108 of using the one or more processor(s) to determine a minimum selling price of the product based on the original price and the discount from each merchant of the plurality of merchants. The method 100 may include a step 110 of using the one or more processor(s) to rank the plurality of merchants based on the minimum selling price of each merchant and determine top N merchants out of the plurality of merchants. A user may put in an order for the product, the system may allocate the order to a highest rank merchant out of the top N merchants.

Steps 102 to 110 are shown in a specific order, however other arrangements are possible. Steps may also be combined in some cases. Any suitable order of steps 102 to 110 may be used.

Figure 2:
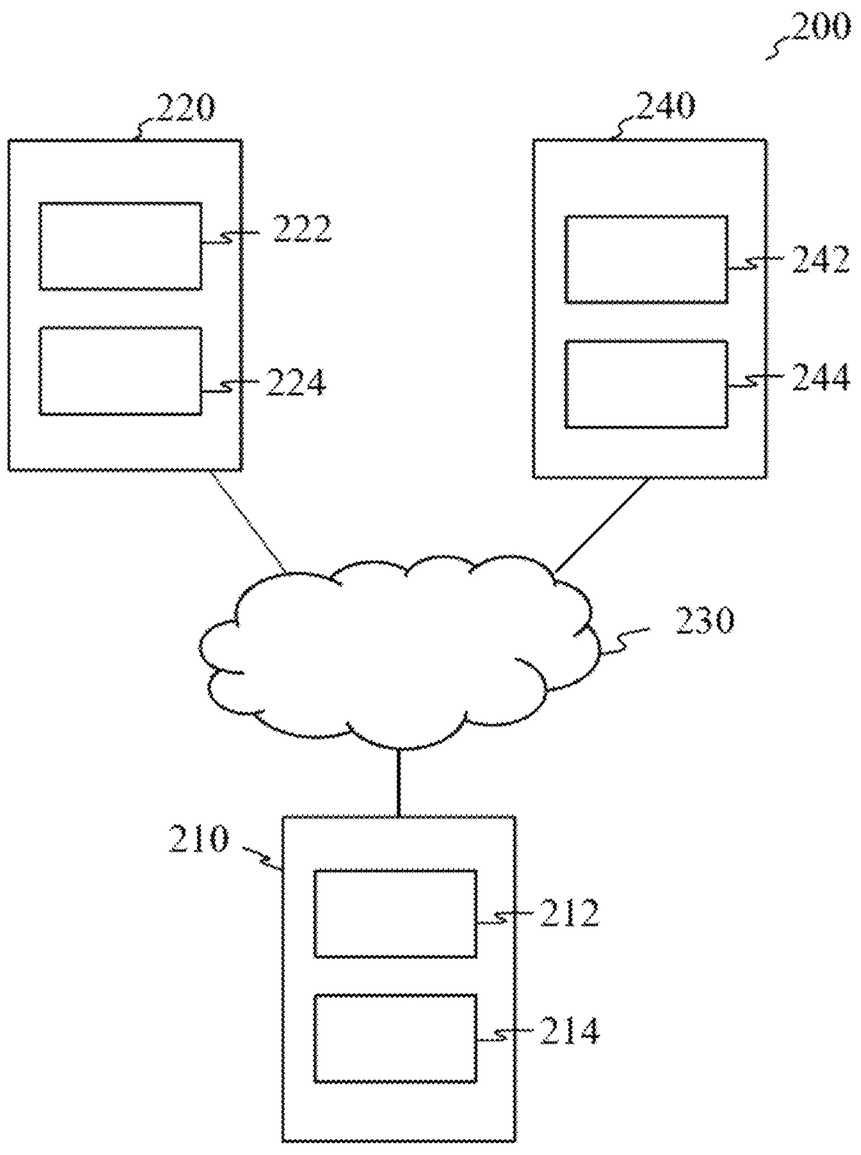
FIG. 2 shows a schematic diagram of a system configured for managing orders according to various embodiments.

FIG. 2 shows a schematic diagram of a system configured for managing orders according to various embodiments.

According to various embodiments, the communication system 200 may include a server 210, and/or a user device 220, and/or a merchant device 240.

In some embodiments, the server 210 and the user device 220 may be in communication with each other through communication network 230. The server 210 and the merchant device 240 may also be in communication with each other through communication network 230. Even though FIG. 2 shows lines connecting the server 210, the user device 220, and the merchant device 240, to the communication network 230, in some embodiments, the server 210, the user device 220, and the merchant device 240, may not be physically connected to each other, for example through a cable. Instead, the server 210, the user device 220, and the merchant device 240, may be able to communicate wirelessly through communication network 230 by internet communication protocols or through a mobile cellular communication network.

In various embodiments, the server 210 may be a single server as illustrated schematically in FIG. 2, or have the functionality performed by the server 210 distributed across multiple server components. The server 210 may include one or more server processor(s) 212. The various functions performed by the server 210 may be carried out by the one or more server processor(s) 212. In some embodiments, the various functions performed by the server 210 may be carried out across the one or more server processor(s). In other embodiments, each specific function of the various functions performed by the server 210 may be carried out by specific server processor(s) of the one or more server processor(s).

In some embodiments, the server 210 may include a memory 214. The server 210 may also include a database. The database may be in the memory 214. The memory 214 and the database may be one component or may be separate components. The memory 214 of the server may include computer executable code defining the functionality that the server 210 carries out under control of the one or more server processor 212. The database and/or memory 214 may include historical data of a plurality of merchants, e.g., locations of the plurality of merchants and/or category of items sold by the plurality of merchants, and/or preparation time of the plurality of merchants, and/or user preferences of a plurality of users. The memory 214 may include or may be a computer program product such as a non-transitory computer-readable medium.

According to various embodiments, a computer program product may store the computer executable code including instructions for managing orders according to the various embodiments. The computer executable code may be a computer program. The computer program product may be a non-transitory computer-readable medium. The computer program product may be in the communication system 100 and/or the server 210.

In some embodiments, the server 210 may also include an input and/or output module allowing the server 210 to communicate over the communication network 230. The server 210 may also include a user interface for user control of the server 210. The user interface may include, for example, computing peripheral devices such as display monitors, user input devices, for example, touchscreen devices and computer keyboards.

In various embodiments, the user device 220 may include a user device memory 222 and a user device processor 224. The user device memory 222 may include computer executable code defining the functionality the user device 220 carries out under control of the user device processor 224. The user device memory 222 may include or may be a computer program product such as a non-transitory computer-readable medium. The user device 220 may also include an input and/or output module allowing the user device 220 to communicate over the communication network 230. The user device 220 may also include a user interface for the user to control the user device 220. The user interface may be a touch panel display. The user interface may include a display monitor, a keyboard or buttons.

In various embodiments, the merchant device 240) may include a merchant device memory 242, and a merchant device processor 244. The merchant device memory 242 may include computer executable code defining the functionality the merchant device 240 carries out under control of the merchant device processor 244. The merchant device memory 242 may include or may be a computer program product such as a non-transitory computer-readable medium. The merchant device 240 may also include an input and/or output module allowing the merchant device 240 to communicate over the communication network 230. The merchant device 240 may also include a user interface for the user to control the merchant device 240. The user interface may be a touch panel display. The user interface may include a display monitor, a keyboard or buttons.

In various embodiments, the communication system 200 may include a plurality of user devices, and/or a plurality of merchant devices, and/or a plurality of merchant devices. For the sake of brevity, duplicate descriptions of features and properties are omitted. It will be understood that any features and property described herein for the user device 220, and/or the merchant device 240, may apply to the plurality of user devices, and/or the plurality of merchant devices.

In various embodiments, the server 210 may be configured for managing orders.

In some embodiments, the user may use the user device 220 to order a product. In some embodiments, the server 210 may receive the user order over the communication network 230 from the user device 220. In various embodiments, the server 210 may determine a plurality of merchants selling the product within a predetermined area. In various embodiments, the server 210 may determine an original price of the product sold by each merchant of the plurality of merchants. In various embodiments, the server 210 may determine a discount that each merchant of the plurality of merchants is willing to offer on the product. In various embodiments, the server 210 may determine a minimum selling price of the product based on the original price and the discount from each merchant of the plurality of merchants. In various embodiments, the server 210 may rank the plurality of merchants based on the minimum selling price of each merchant and determine top N merchants out of the plurality of merchants. In various embodiments, the server 210 may allocate the order to a highest rank merchant out of the top N merchants.

In an embodiment, merchant quality may indicate how satisfied the customers are. Merchant quality may be measured in a number of ways. For example, rating by customers who ordered from the merchants, percentage of orders fulfilled by the merchants, average time taken to prepare the order.

In various embodiments, the predetermined area may be a geohash or town or may be determined based on a fixed area or radius.

In various embodiments, the user may be unaware of which merchant the one or more processor(s) allocates the order to until the user receives the product.

In various embodiments, the one or more processor(s) may be configured to determine an order price for the product based a maximum selling price out of the minimum selling price of each merchant in the top N merchants.

In various embodiments, the user may be notified of the order price of the product at the time of placing the order.

In various embodiments, the one or more processor(s) may be configured to allocate the order to a second highest rank merchant out of the top N merchants if the highest rank merchant rejects the order.

In various embodiments, the one or more processor(s) may be configured to receive information from each merchant out of the plurality of merchants every M period. The one or more processor(s) may be configured to redetermine a new top N merchants based on the information from each merchant.

In various embodiments, the information may include at least one of: current merchant demand, and current availability of product. The information may also include a proximity of the merchant to the customer.

In various embodiments, the user may be located in the predetermined area, which may be the same predetermined area which the merchant is located in.

Advantageously, the embodiments disclosed herein may solve the demand and supply mismatch problem by creating food items to offer to users without committing to any restaurant provider prior to food preparation. In an embodiment, such food items may be referred herein as Foodwire items.

In an embodiment, the user may be unaware of which merchant the system 100 allocates the order to until the user receives the product. In an embodiment, the user may find out which restaurant prepared their order only when the food is delivered. This may give the system 100 e.g., a food delivery platform, more flexibility in assigning orders to merchants with capacity to fulfill the orders. In exchange for not knowing which merchant prepares the food order for them, the users may get a discount on the product ordered.

In various embodiments, the merchants may need to opt-in to offer Foodwire items, and may need to agree to discount their items when they receive orders from users who order from Foodwire items. In various embodiments, the merchants may set criteria such as which items they want to exclude from the offering as Foodwire items, hours that will be excluded from taking such orders, and maximum discount they are willing to accept. In various embodiments, the merchants may also restrict their Foodwire items to new customers to avoid cannibalizing their existing sales.

In various embodiments, an exemplary user experience may be as follows: a user opens his food delivery app to order a product (e.g., chicken rice). The user conducts a search for the product, and finds that merchant A sells the product at a price of $10. The user is offered the product (e.g., chicken rice) as a Foodwire product at $8, provided that a specific merchant is not chosen by the user. The user makes an order for the Foodwire product. After receiving the order from the user, the system goes through the list of merchants with sufficient capacity to fulfill the order. The system may assign the order to merchant B, which may have the best quality among the available merchants. The user only finds out that merchant B prepared his order after receiving the product.

In various embodiments, to support the user experience of ordering Foodwire items at discounted prices as described above, the system may need to provide an interface for restaurant operators to input their desire to participate in such offerings, as they have to agree to offer items to users at a discount. Merchants who opt-in may set a maximum discount amount, list of menu items to offer, dayparts that Foodwire items will be offered.

In various embodiments, the system may need to identify the food items that are eligible for serving to the user as Foodwire items at serving time. In various embodiments, the system may include a Foodwire item identification engine which may parse all the food items offered by restaurant operators, and may identify items suitable to offer. Foodwire items may include items offered by enough merchants within close proximity with similar quality and price point. To reduce the latency of serving the eligible items to the end user, this identification process may be done offline.

In various embodiments, the system may retrieve all the eligible merchants that offer the item that the user is interested in as a Foodwire item. In various embodiments, the system may include a restaurant ranking engine which may rank the merchants based on a number of factors such as expected fulfillment rate, expected preparation time, user rating, listing price of the item of their menu, and maximum discount offered.

In various embodiments, the system may include a pricing engine which may determine the price that will be offered to the user. The price may be determined based on the discounted price of all the eligible items. In various embodiments, the price of the Foodwire item may be the maximum of the discounted prices of the item from the top N ranked merchants, wherein N is an adjustable parameter. In various embodiments, setting the price in this manner may give the platform more flexibility to assign the order to any of the top N merchants. In various embodiments, the larger N is, the more flexibility the platform has, but it will also increase the offer price to the user and make the Foodwire item less attractive. Hence, there is a tradeoff between choosing a large compared to a small N.

In various embodiments, the system may include an order assignment engine. When the user places an order for the Foodwire item, the order assignment engine may assign the order to the merchant with the highest rank first. If, that top ranked merchant cannot fulfill the order, the assignment engine may reassign the order to the second ranked merchant, and so on. This may ensure a high fulfillment rate of the order with eligible merchants.

FIG. 3 shows an exemplary table 300 of quality scores of various merchants according to various embodiments.

In the exemplary table 300 includes information including a name 302 of the merchants, a listing price 304, a maximum discount offered 306, a minimum offer price 308, a quality score 310, a ranking score 312 and a ranking 314.

In an embodiment, merchant quality may indicate how satisfied the customers are. Merchant quality may be measured in a number of ways. For example, rating by customers who ordered from the merchants, percentage of orders fulfilled by the merchants, average time taken to prepare the order.

In an embodiment, there may be various merchants (e.g., five merchants) offering a same or similar item with different listing price and quality. The system may use a quality score that ranges from 0 to 1 to summarize the quality of the merchant's offer in terms of user rating, fulfillment rate, etc. Each merchant 302 can offer the maximum discount rate 306 that they are willing to accept for providing the item as a Foodwire item. The system may first determine the minimum offer price 308 for each merchant 302. Then, the system may calculate the ranking score 312 for each merchant as: Ranking score 312=Minimum offer price 308×(1−Quality score 310). Merchants with lower ranking scores 312 may be more competitive and may be ranked higher.

In an embodiment, the parameter N may be predetermined and may be for example 3 merchants. In the event which N is set to 3, only the top 3 ranked restaurants will be considered to fulfill the order. The price that will be offered to the user will be the maximum between those top 3 merchants 302 (for example merchants 2, 3 and 5). The price would be for example $8.80. When the order comes in, it will be assigned to restaurant 2 first as it is the top ranked restaurant. The restaurant will make a gross revenue of $8.80, higher than their minimum offer price of $8.08. In an event, merchant 2 cannot fulfill the order, it will be assigned to merchant 5, the second highest ranked merchant to fulfill.

Figure 4:
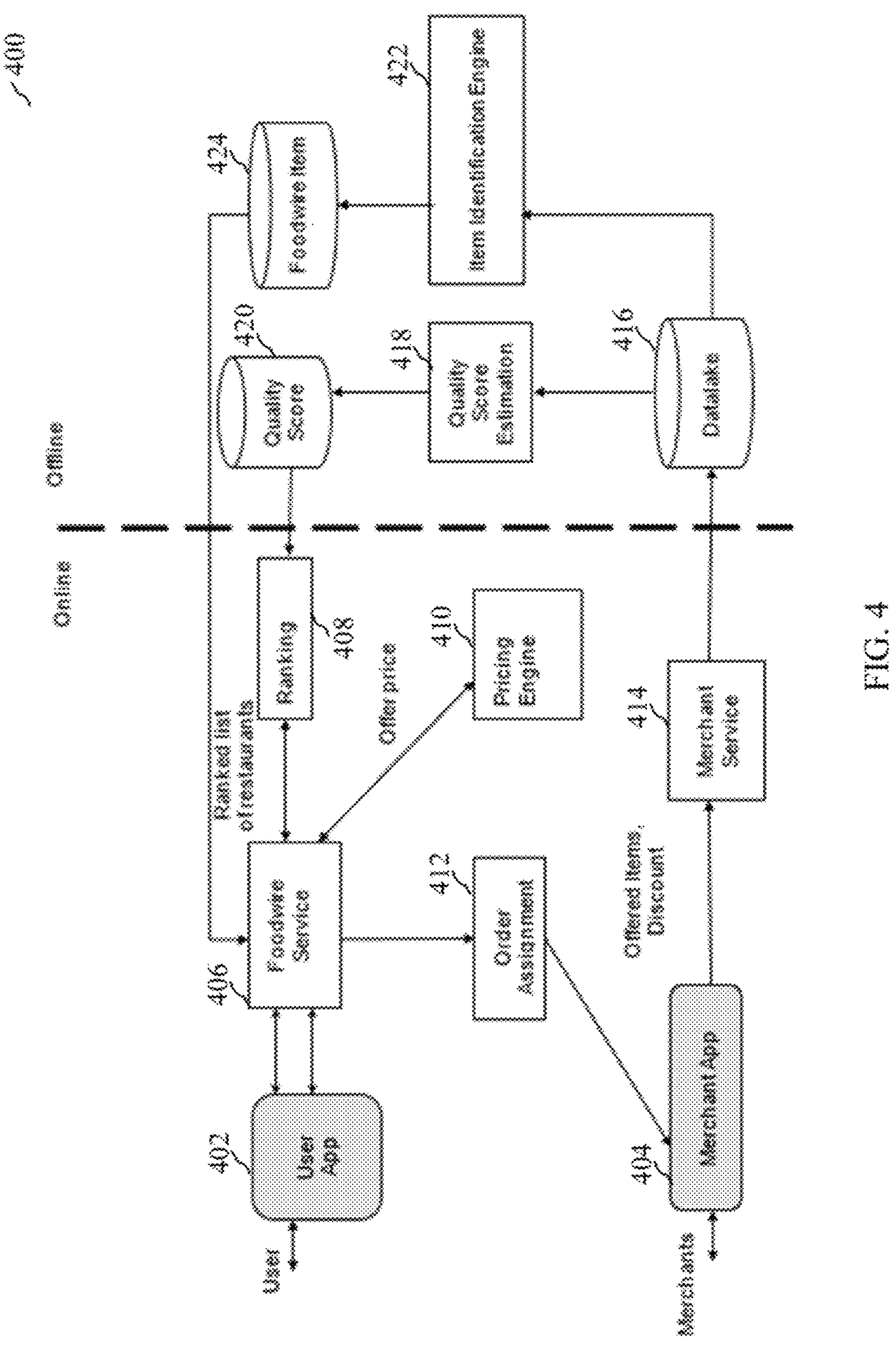
FIG. 4 shows an exemplary flowchart of a system configured for managing orders according to various embodiments.

FIG. 4 shows an exemplary flowchart 400 of a system configured for managing orders according to various embodiments As shown in flowchart 400, a user may use user app 402 in a user device to order products. Merchants may use a merchant app 404 in merchant devices to receive orders from the user through the previously disclosed system.

In various embodiments, during the setup phase, the merchants (e.g., restaurant operators) may use the merchant app 404 to input offered items and discount they are willing to offer. The information provided by the merchants may be received by a merchant service engine 414. In an embodiment, the merchant service engine 414 may forward the information to datalake 416. Foodwire items, and the quality score for each Foodwire items may be determined offline. In various embodiments, the datalake 416 passes the information from the merchant service engine 414 to a quality score estimation engine 418. The quality score estimation engine 418 may determine a quality score for each merchant. The quality score estimation engine 418 may pass the quality score for each merchant to a quality score store 420. In various embodiments, the datalake 416 passes the information from the merchant service engine 414 to an item identification engine 422. The item identification engine 422 may determine if an item provided by the merchant is a Foodwire item. The item identification engine 422 may pass information regarding Foodwire item(s) provided by the merchant to a Foodwire item store 424.

In various embodiments, at serving time, the user may conduct a search for the product they want. A Foodwire service engine 406 may retrieve eligible items from the Foodwire item store 424. In various embodiments, Foodwire service engine 406 may get rankings of the eligible items from a ranking engine 408. The ranking engine 408 may retrieve the quality score of each merchant from the quality score store 420. A ranked list of merchants for the product may be passed to a pricing engine 410 to get an offer price for the item to the user. The offer price may be sent back to the user for his consideration. If the user decides to place the order, the Foodwire service engine 406 may assign the order to the merchant by sending the order to the Merchant app 404 of the selected merchant through an order assignment service engine 412.

While the invention has been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A system configured for managing orders, the system comprising: one or more processor(s); and
   - a memory having instructions stored therein, the instructions, when executed by the one or more processor(s), cause the one or more processor(s) to:
   - determine, via a server, a plurality of merchants selling a product within a predetermined area;
   - determine, via the server, an original price of the product sold by each merchant of the plurality of merchants;
   - determine, via the server, a discount that each merchant of the plurality of merchants is willing to offer on the product;
   - determine, via a pricing engine, a minimum selling price of the product based on the original price and the discount from each merchant of the plurality of merchants; and
   - rank, via a ranking engine, the plurality of merchants based on the minimum selling price of each merchant and a dynamic merchant quality score determined from historical fulfillment rate, delivery time performance, and customer feedback, and determine top N merchants out of the plurality of merchants;

wherein when a user puts in an order for the product, the system automatically allocates, via an order assignment engine, the order to a highest rank merchant out of the top N merchants.

2. The system of claim 1, wherein the user is unaware of which merchant the one or more processor allocates the order to until the user receives the product.

3. The system of claim 1, wherein the one or more processor is configured to:
   - determine an order price for the product based a maximum selling price out of the minimum selling price of each merchant in the top N merchants.

4. The system of claim 3, wherein the user is notified of the order price of the product at the time of placing the order.

5. The system of claim 1, wherein the one or more processor is configured to:
   - allocate the order to a second highest rank merchant out of the top N merchants if the highest rank merchant rejects the order.

6. The system of claim 1, wherein the one or more processor is configured to:
   - receive information from each merchant out of the plurality of merchants every M period;
   - redetermine a new top N merchants based on the information from each merchant.

7. The system of claim 6, wherein the information comprises at least one of: current merchant demand, and current availability of product.

8. The system of claim 1, wherein the user is located in the predetermined area.

9. A method for managing orders, the method comprising: using one or more processor(s) to:
   - determine, via a server, a plurality of merchants selling a product within a predetermined area;
   - determine, via the server, an original price of the product sold by each merchant of the plurality of merchants;
   - determine, via the server, a discount that each merchant of the plurality of merchants is willing to offer on the product;
   - determine, via a pricing engine, a minimum selling price of the product based on the original price and the discount from each merchant of the plurality of merchants; and
   - rank, via a ranking engine, the plurality of merchants based on the minimum selling price of each merchant and a dynamic merchant quality score determined from historical fulfillment rate, delivery time performance, and customer feedback, and determine top N merchants out of the plurality of merchants;

wherein when a user puts in an order for the product, the system automatically allocates, via an order assignment engine, the order to a highest rank merchant out of the top N merchants.

10. The method of claim 9, wherein the user is unaware of which merchant the one or more processor allocates the order to until the user receives the product.

11. The method of claim 9, the method comprising using the one or more processor to:
    - determine an order price for the product based a maximum selling price out of the minimum selling price of each merchant in the top N merchants.

12. The method of claim 11, wherein the user is notified of the order price of the product at the time of placing the order.

13. The method of claim 9, the method comprising using the one or more processor to:
    - allocate the order to a second highest rank merchant out of the top N merchants if the highest rank merchant rejects the order.

14. The method of claim 9, the method comprising using the one or more processor to:
    - receive information from each merchant out of the plurality of merchants every M period;
    - redetermine a new top N merchants based on the information from each merchant.

15. The method of claim 14, wherein the information comprises at least one of: current merchant demand, and current availability of product.

16. The method of claim 9, wherein the user is located in the predetermined area.

17. A non-transitory computer-readable medium storing computer executable code comprising instructions for managing orders according to claim 1.

* * * * *